United States Patent
Hao et al.

(10) Patent No.: US 9,402,002 B1
(45) Date of Patent: Jul. 26, 2016

(54) OPEN API FOR TOLL FREE DATA ON DEMAND

(71) Applicant: Verizon Patent and Licensing Inc., Arlington, VA (US)

(72) Inventors: Jianxiu Hao, Acton, MA (US); Jian Huang, Sudbury, MA (US); Fenglin Yin, Lexington, MA (US); Pramod Kalyanasundaram, Acton, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/823,144

(22) Filed: Aug. 11, 2015

(51) Int. Cl.
*H04W 4/24* (2009.01)
*H04M 15/00* (2006.01)
*H04L 29/08* (2006.01)

(52) U.S. Cl.
CPC ........... *H04M 15/8214* (2013.01); *H04L 67/02* (2013.01); *H04M 15/09* (2013.01)

(58) Field of Classification Search
CPC ..................................................... H04W 4/24
USPC ............................... 455/405–406, 411, 414.1
See application file for complete search history.

(56) References Cited

U.S. PATENT DOCUMENTS

| | | | | |
|---|---|---|---|---|
| 7,328,189 B2* | 2/2008 | Ling | ...................... | G06Q 20/04 705/41 |
| 8,484,568 B2* | 7/2013 | Rados | ................. | H04L 41/5032 715/745 |
| 2011/0276442 A1* | 11/2011 | Momtahan | ............. | G06Q 30/00 705/30 |
| 2013/0217357 A1* | 8/2013 | Menezes | ................. | H04W 4/26 455/406 |

* cited by examiner

*Primary Examiner* — Michael T Vu

(57) ABSTRACT

A network device receives registration information for a vendor application that selectively provides access to toll-free data for users. The registration information include a vendor account to which data charges can be billed. In response to the registration information, the network device sends a token corresponding to the vendor application. The network device receives, from a vendor device, an application programming interface (API) call that includes the token, a data flow identifier, and flow information. The flow information identifies a particular data flow directed to a copy of the vendor application residing on a user device. The network device validates the token; causes data charges for particular data packets, corresponding to the flow information, to be billed to the vendor account; and sends, to the vendor device, a response to the API call that includes the data flow identifier.

20 Claims, 9 Drawing Sheets

US 9,402,002 B1

OPEN API FOR TOLL FREE DATA ON DEMAND

BACKGROUND

An API (application programming interface) uses a collection of software functions and procedures, referred to as API calls, that can be executed by other software applications. Service providers (e.g., telecommunications providers) may provide APIs that vendors can use to access services/features that are included in software products that vendors may eventually offer to consumers (e.g., end users).

In wireless data plans, data usage for end users is typically charged to an account associated with each end user. The end user account may have a periodic limit on total data usage, for example on wireless networks (e.g., a 2 Gigabyte per month data plan). End users on networks that have periodic limits for data usage often arrange their data usage behavior to avoid overages associated with periodic limits on data usage. Toll-free data services allow service providers to charge certain types of data usage by end users to third-party vendors, thus allowing end users to access certain content without concern for overages.

DETAILED DESCRIPTION OF PREFERRED EMBODIMENTS

The following detailed description refers to the accompanying drawings. The same reference numbers in different drawings may identify the same or similar elements.

Systems and methods provided herein provide an on-demand toll-free data (TFD) service for third-party vendors that provide mobile applications. The systems and methods use data captured for each data call going through a wireless access network, such as network flows. The data is applied to an application program interface (API) call that enables the third-party vendors to provide on-demand TFD usage to mobile applications. The service provider network may charge each data flow for a user device (e.g., a Hyper-text Transfer Protocol (HTTP), Transmission Control Protocol (TCP), or User Datagram Protocol (UDP) connection) to either a user account (for the user device) or a third-party vendor account. Using the API call, the third-party vendor may signal to pay wireless data fees for any particular data flow related to a mobile application on the user device. Otherwise, the default is to charge the user's account.

According to one implementation described herein, a network device may receive registration information for a vendor application that selectively provides access to toll-free data for users. The registration information includes a vendor account to which data charges can be billed. In response, the network device may send a token corresponding to the vendor application. The network device may later receive, from a vendor device, an API call that includes the token, a data flow identifier, and flow information. The flow information identifies a particular data flow directed to a copy of the vendor application residing on a user device. The network device may validate the token; may cause data charges for particular data packets, corresponding to the flow information, to be billed to the vendor account; and may send, to the vendor device, a response to the API call that includes the data flow identifier.

Figure 1:
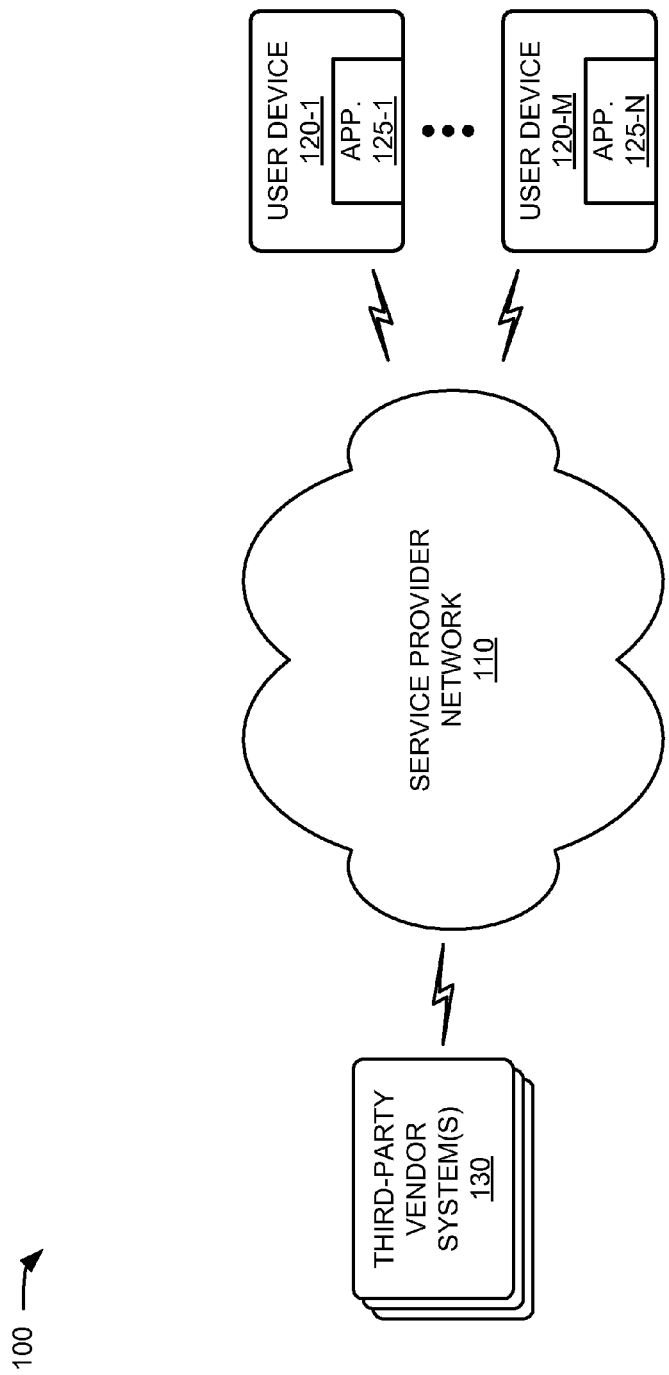
FIG. 1 is a diagram illustrating an exemplary network environment in which systems and/or methods described herein may be implemented.

FIG. 1 is a diagram illustrating an exemplary network environment 100 in which systems and/or methods described herein may be implemented. As illustrated, network environment 100 may include a service provider network 110 that includes a wireless access network 115, user devices 120-1 through 120-M (collectively "user devices 120" and singularly "user device 120") with applications 125-1 through 125-N (collectively "applications 125" and singularly "applications 125"), and third-party vendor systems 130. Components of network environment 100 may be connected via wired and/or wireless links.

Service provider network 110 may include one or more wired, wireless and/or optical networks that are capable of receiving and transmitting data, voice and/or video signals, including multi-media signals that may include voice, data and video information. For example, Service provider network 110 may include one or more public switched telephone networks (PSTNs) or other type of switched network. Service provider network 110 may also include one or more wireless networks (e.g., cellular networks) and may include a number of transmission towers for receiving wireless signals and forwarding the wireless signals toward the intended destinations. Service provider network 110 may further include one or more satellite networks, one or more packet switched networks, such as an IP-based network, a local area network (LAN), a wide area network (WAN), a personal area network (PAN) (e.g., a wireless PAN), a wireless local area network (WLAN), an intranet, the Internet, or another type of network that is capable of transmitting data.

Service provider network 110 may provide, among other services, access to digital content, such as web pages, downloads, or streaming media available from third-party vendor systems 130 for user devices 120. In an exemplary implementation, service provider network 110 may represent a network associated with a service provider that provides various services, such as Internet-protocol (IP) related services, value added services, etc. For example, in one implementation, service provider network 110 may represent an Internet-protocol Multimedia Subsystem (IMS) network that provides services to IMS subscribers.

Service provider network 110 may monitor data consumption by user devices 120 over all or portions of service provider network 110. In some instances, service provider network 110 may manage accounts with limited data quotas over some or all of network environment 100. For example, a single user device 120 may be registered with a mobile data plan that includes a one (1) GB per month limit, with charges incurred by the user for additional data use over the monthly limit. As another example, a home account with an Internet service provider (ISP) may be accessible by multiple user devices 120 and may include a cumulative 250 GB data limit per month, with charges incurred for additional data use over the monthly limit. According to implementations described herein, some content from the third-party vendor systems 130 may be signaled as TFD content that is provided to user devices 120 without being credited toward a user's monthly data limit and/or accruing data use charges.

User device 120 may include a computational or communication device. User device 180 may be associated with a subscriber to telephony services and/or data usage services provided in association with service provider network 110. Data usage services may include any activity that consumes data and may be implemented, for example, in conjunction with or as a consequence of, user device 120 sending or receiving data from accessing websites, applications, etc. User device 120 may enable a user to view data/content from third-party vendor systems 130. For example, user device 120 may include a personal computer (e.g., a laptop or desktop PC), a tablet computer, a smart phone, an Internet-enable television (e.g., a smart TV), a set-top box (STB), a gaming system, or another type of computational or communication device that can communicate with devices in network environment 100. In one implementation, user device 120 may include one or more applications 125 to access data from third-party vendor systems 130 via service provider network 110. Applications 125 may also be referred to herein as "mobile applications" or "vendor applications." Copies of the same application 125 may be distributed to multiple user devices 120. As used herein, the terms "application" and "copy of the application" may be used interchangeably.

According to implementations described herein, applications 125 on user device 120 may receive select TFD designations from third-party vendor systems 130 and employ API calls that enable third-party vendor systems 130 to designate particular data flows (e.g., HTTP or TCP flows or a UDP connection) for application 125 as toll-free data. Applications 125 may be developed by third parties and include, for example, streaming media applications to access content from a particular content provider (e.g., a particular third-party).

Third-party vendor systems 130 may include one or more network devices or computing devices. Third-party vendor systems 130 may collect, generate, and provide data consuming content that may be accessed by subscribers of network 110 via user devices 120. Data consuming content may include, for example, web pages, applications, encoded video content in any of a variety of formats, including, for example, Multiview Video Coding (MVC), Moving Picture Experts Group (MPEG)-2 TS, etc. Third-party vendor systems 130 may provide media content to a mobile user device 120 or a user device 120 connected to a subscriber's home network. Additionally, third-party vendor systems 130 may interface with service provider network 110 to register applications 125 that third-party vendor systems 130 provide to user devices 120. The registration process provides third-party vendor systems 130 with information to allow third-party vendor systems 130 to designate selectively particular data/content that a third party may want to make toll-free for end users of application 125. Examples of TFD content may include (without limitation) website content, movie trailers, mobile app downloads, sample music tracks, product catalogs, promotional videos, etc.

In operation, third-party vendor system 130 may register an application 125 with service provider network 110. A unique application identifier is assigned to application 125, and service provider network 110 issues to third-party vendor system 130 a secret token for the application. Third-party vendor system 130 may then designate, via application 125, particular content that will be toll-free for the user of user device 120/application 125. Application 125 may be used to indicate to the user which data is toll-free, and third-party vendor systems 130 can modify toll-free designations as desired.

When toll-free content is selected by the user, application 125 may provide a first API call, to third-party vendor system 130, that identifies the particular data flow of the toll-free content (e.g., by indicating the source IP address, the source port, the destination IP address, and the destination port). In response to the first API call, third-party vendor system 130 may generate a second API call, to service provider network 110, that provides the application identifier, the secret token, and the data flow information. In response to the second API call, service provider network 110 will validate the token, identify the flow, and direct billing to an account associated with the application identifier. The service provider can then return a confirmation back to third-party vendor system 130 to indicate a successful TFD exchange.

In FIG. 1, the particular arrangement and number of components of network environment 100 are illustrated for simplicity. In practice, there may be more service provider networks 110, user devices 120, and third-party vendor systems 130. For example, there may be thousands of third-party vendor systems 130 and hundreds of thousands user devices 120.

Figure 2:
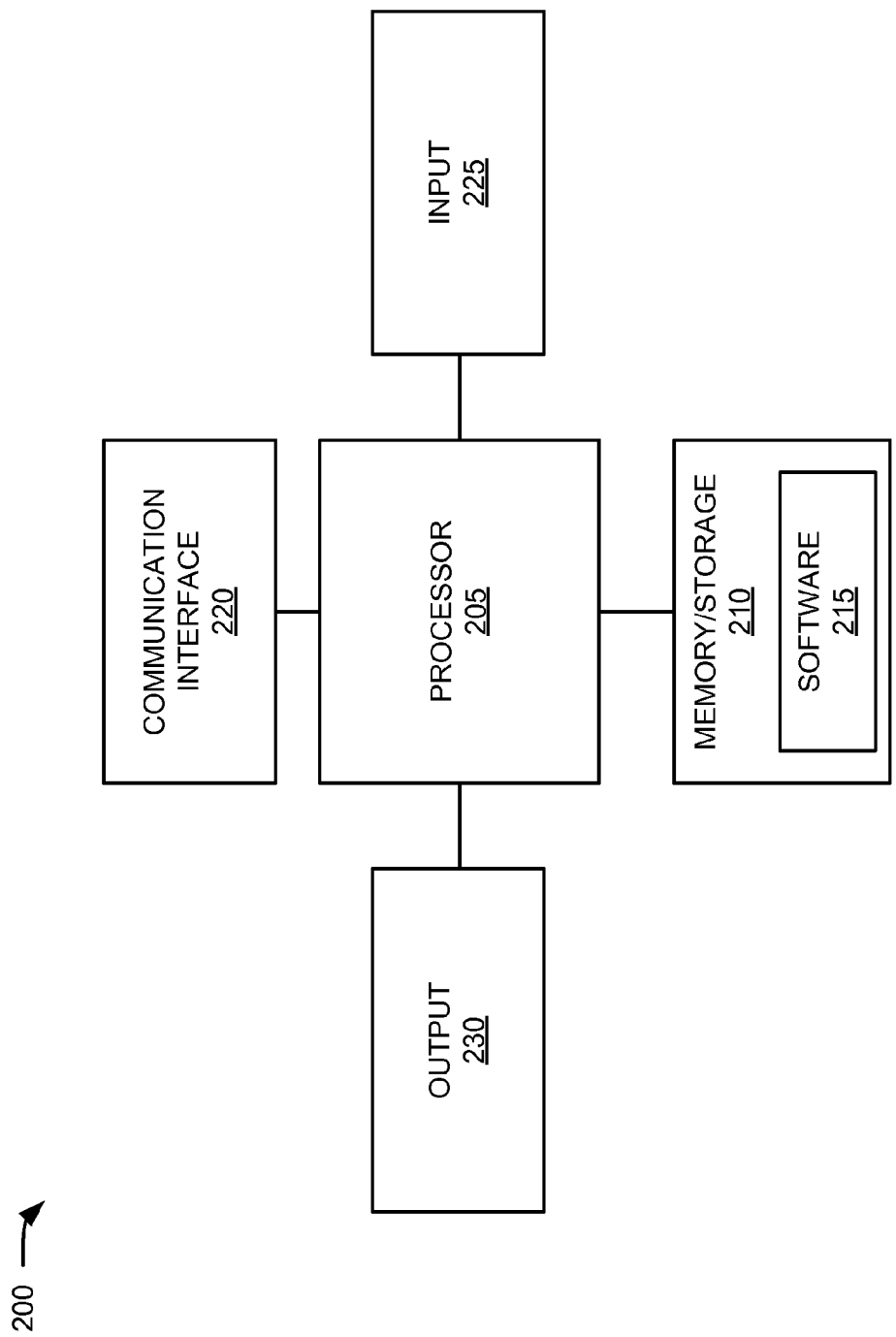
FIG. 2 is a block diagram illustrating exemplary components of a device that may correspond to one or more of the devices of FIG. 1.

FIG. 2 is a diagram illustrating exemplary components of a device 200 that may correspond to one or more devices in service provider network 110, user device 120, and/or third-party vendor system 130. As illustrated, according to an implementation, device 200 includes a processor 205, memory/storage 210 that stores software 215, a communication interface 220, an input 225, and an output 230. According to other implementations, device 200 may include fewer components, additional components, different components, and/or a different arrangement of components than those illustrated in FIG. 2 and described herein.

Processor 205 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 205 may be implemented as hardware (e.g., a microprocessor, etc.), a combination of hardware and software (e.g., a SoC, an ASIC, etc.), may include one or multiple memories (e.g., cache, etc.), etc.

Processor 205 may control the overall operation or a portion of operation(s) performed by device 200. Processor 205 may perform one or multiple operations based on an operating system and/or various applications or programs (e.g., software 215). Processor 205 may access instructions from memory/storage 210, from other components of device 200, and/or from a source external to device 200 (e.g., a network, another device, etc.).

Memory/storage 210 includes one or multiple memories and/or one or multiple other types of storage mediums. For example, memory/storage 210 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 210 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 210 may include drives for reading from and writing to the storage medium.

Memory/storage 210 may be external to and/or removable from device 200, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 210 may store data, software, and/or instructions related to the operation of device 200.

Software 215 includes an application or a computer program that provides a function and/or a process. Software 215 may include firmware. For example, with reference to user device 120, software 215 may include an application that, when executed by processor 205, provides the ability trigger a request for TFD data on-demand, as described herein.

Communication interface 220 permits device 200 to communicate with other devices, networks, systems, etc. Communication interface 220 may include one or multiple wireless interfaces and/or wired interfaces. Communication interface 220 may include one or multiple transmitters and receivers or transceivers. Communication interface 220 may include one or multiple antennas. Communication interface 220 may operate according to a protocol, layers (e.g., radio resource control (RRC), packet data convergence control (PDCC), non-access stratum (NAS), etc.) and a communication standard (e.g., Long-term Evolution (LTE), etc.).

Input 225 permits an input into device 200. For example, input 225 may include a keyboard, a mouse, a display, a touchscreen, a touchless screen, a button, a switch, an input port, speech recognition logic, and/or some other type of visual, auditory, tactile, etc., input component. Output 230 permits an output from device 200. For example, output 230 may include a speaker, a display, a touchscreen, a touchless screen, a light, an output port, and/or some other type of visual, auditory, tactile, etc., output component.

Device 200 may perform a process and/or a function, as described herein, in response to processor 205 executing software 215 stored by memory/storage 210. By way of example, instructions may be read into memory/storage 210 from another memory/storage 210 (not shown) or read from another device (not shown) via communication interface 220. The instructions stored by memory/storage 210 may cause processor 205 to perform a process described herein. Alternatively, for example, according to other implementations, device 200 may perform a process described herein based on the operation of hardware (processor 205, etc.).

Figure 3:
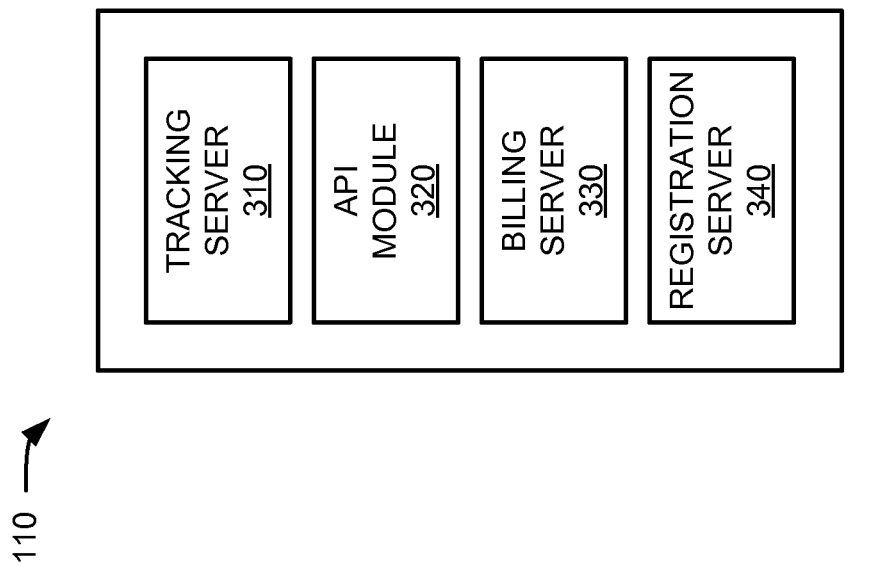
FIG. 3 is a block diagram of exemplary functional components of the service provider network of FIG. 1.

FIG. 3 is a block diagram illustrating exemplary functional components of service provider network 110. As shown in FIG. 3, service provider network 110 may include a tracking server 310, an API module 320, a billing server 330, and a registration module 340.

Tracking server 310 may capture data for each data call going through service provider network 110 (or, in some implementations, a wireless access portion of service provider network 110). For example, tracking server 310 may collect data from network layer 3 or layer 4 flows. Collected data for each data flow may include, for example, a subscriber identity value (e.g., a mobile station ID (MSID), a MDN, or an international mobile subscriber identity (IMSI) of the user device), an allocated IP address (for IPv4 or IPv6), an allocated network address translation (NAT) IPv4 address (i.e., the public IPv4 address assigned to the subscriber (for 3G) or session (for 4G)), a NAT address port chunk start (i.e., the first port of a group of contiguous ports assigned to a NAT realm), and a NAT address port chunk size (i.e., the block size of a group of contiguous ports assigned to a NAT realm).

API module 320 may receive and manage API calls from third-party vendor system 130. Particularly, API module 320 may receive an API call for designating TFD on demand. The API call may identify a particular flow (e.g., based on information received from application 125) for which toll-free billing is desired. API module 320 may verify a secret token in the API call, match the flow identified in the API call to the flow tracking data from tracking server 310, and direct charges for the flow to a billing account associated with application 125 and/or third-party vendor 130.

Billing server 330 may control the process that charges a user or vendor for data used over service provider network 110. As a default, billing server 330 may direct charges for each tracked data flow to a subscriber account associated with user device 120. However, based on instructions from API module 320, billing server 330 may direct charges for designated data flows to particular third-party accounts.

Registration module 340 may allow third-party application developers to register an application (e.g., applications 125) for designating TFD on demand. In one implementation, registration module 340 may accessed through a developer's portal that also provides other services to third-party vendors. Access to the developer's portal and/or registration module 340 may require a user account and authentication. Registration module 340 may assign an application ID for application 125 and solicit/obtain financial account information (e.g., a credit card account) for billing TFD associated with application 125. Registration server 340 may also assign a secret token that is required for each API call that designates TFD on demand. In some implementations, registration module 340 may update the secret token (e.g., periodically or upon request).

Although FIG. 3 shows exemplary functional components of service provider network 110, in other implementations, service provider network 110 may include fewer components, different components, or additional components than depicted in FIG. 3. Alternatively, or additionally, one or more functions of service provider network 110 may be performed by one or more other devices of network environment 100.

Figure 4:
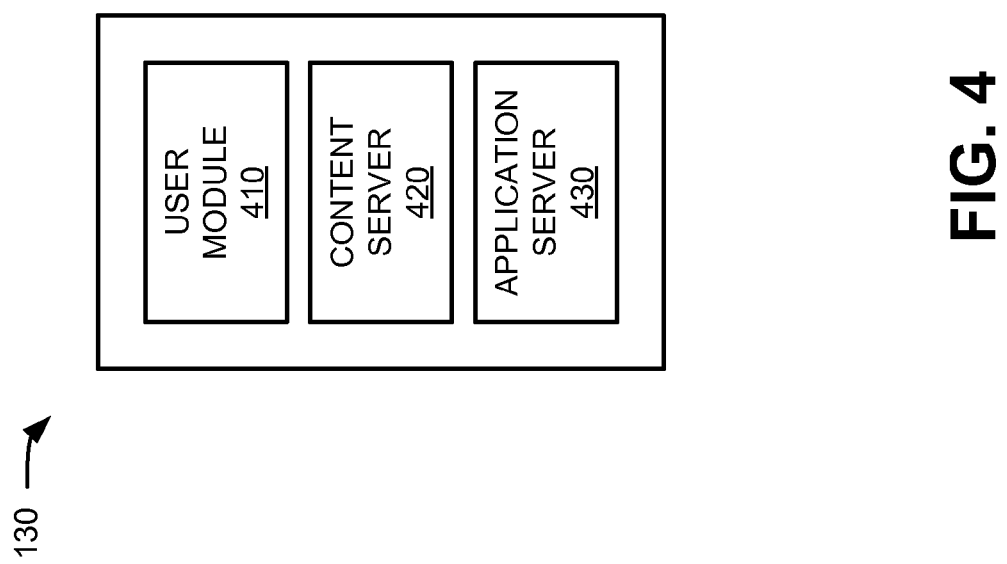
FIG. 4 is a block diagram of exemplary functional components of the third-party system of FIG. 1.

FIG. 4 is a block diagram illustrating exemplary functional components of third-party vendor system 130. As shown in FIG. 4, third-party vendor system 130 may include a user module 410, a content server 420, and an application server 430.

User module 410 may associate users and/or user devices with applications 125. For example, user module 410 may include a database or other memory unit to store user registration information for copies of application 125 that are downloaded to user devices 120.

Content server 420 may store and provide content requested by applications 125. In one implementation, access to content server 420 (e.g., by user device 120 and/or application 125) may be restricted to users with particular subscription packages and enforced by, for example, password protection, device identifiers (for user devices 120), and/or application identifiers (e.g., application 125). Content server 420 may generate a content stream that is compatible with a platform (e.g., a particular combination of hardware software) of some types user devices 120, while another content stream may be used for other types of user devices 120.

Application server 430 may inform applications 125 that particular content will be tool-free (e.g., so that each application 125 may present a toll-free indication to a user). Application server 430 may receive API calls from applications 125 that indicate content requested by the user (of user device 120) is designated as TFD. In response, application server 430 may send to service provider network 110 (e.g., API module 320) an API call for designating the particular data flow for the requested content as TFD. Application server 430 may also receive a conformation from service provider network 110 that a designated data flow has been charged to the third-party account.

Although FIG. 4 shows exemplary functional components of third-party vendor system 130, in other implementations, third-party vendor system 130 may include fewer components, different components, or additional components than depicted in FIG. 4. Alternatively, or additionally, one or more functions of third-party vendor system 130 may be performed by one or more other devices of network environment 100.

Figure 5:
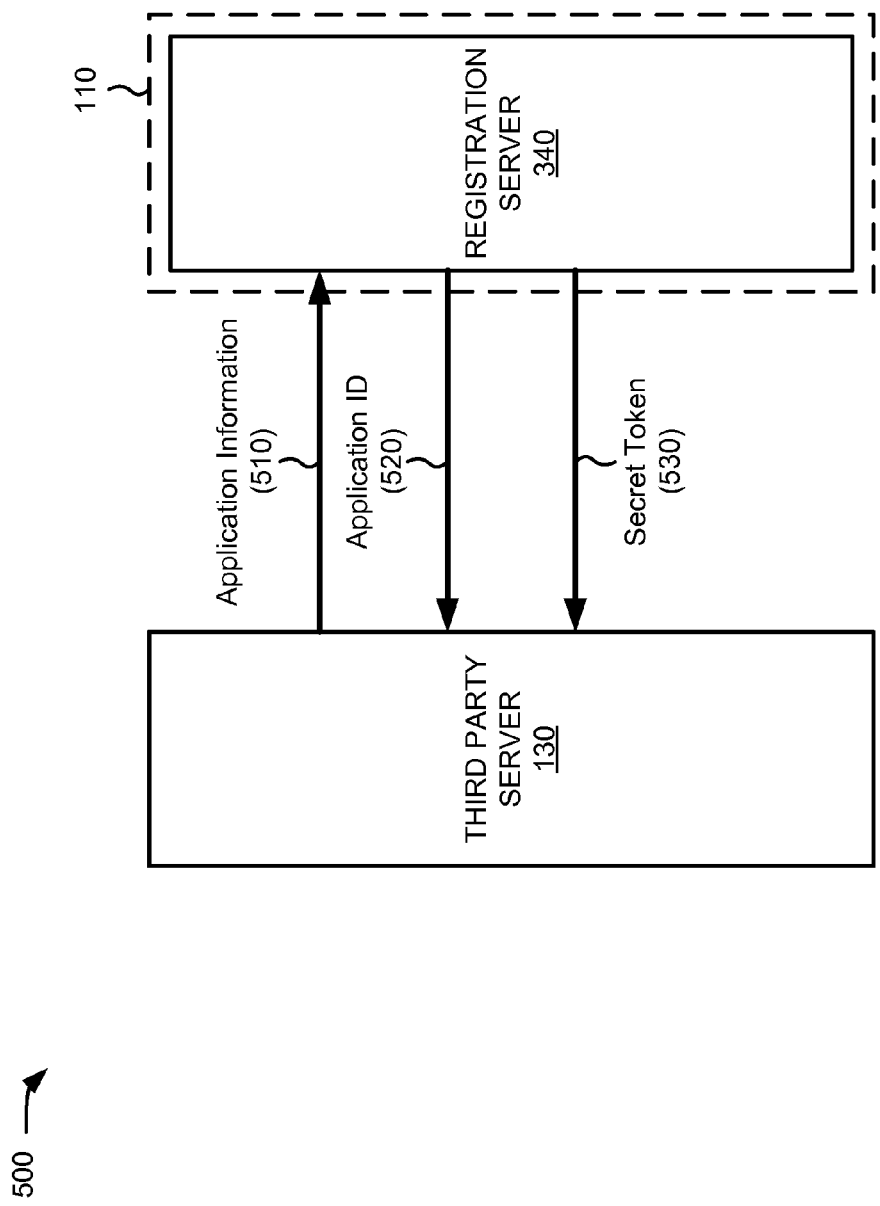
FIG. 5 is a block diagram illustrating exemplary communications between devices in a portion of the network environment of FIG. 1.

FIG. 5 is a block diagram illustrating exemplary communications between devices in a portion 500 of network environment 100. Communications in FIG. 5 may represent communications to register applications for designating TFD on demand. As shown in FIG. 5, network portion 500 may include third-party vendor system 130 and registration server 340 of service provider network 110. Third-party vendor system 130 and registration server 340 may include functionality described above in connection with, for example, FIGS. 1-4.

Referring to FIG. 5, a third-party application developer may use third-party vendor system 130 to register an application (e.g., applications 125) for designating TFD on demand. After providing authentication information to login, third-party vendor system 130 may provide application information 510, such as a title, description, or internal identifier. In response, registration server 340 may provide a globally unique application identifier 520 for application 125. Application identifier 520 may include an alphanumeric string, a hash value, or another unique value.

Registration server 340 may also generate a secret token 530 that may be associated with application 125 or, more particularly, unique application identifier 520. Secret token 530 may be stored by third-party vendor system 130 (e.g., application server 430) and used during each subsequent API call to service provider network 110 for TFD on demand.

Figure 6:
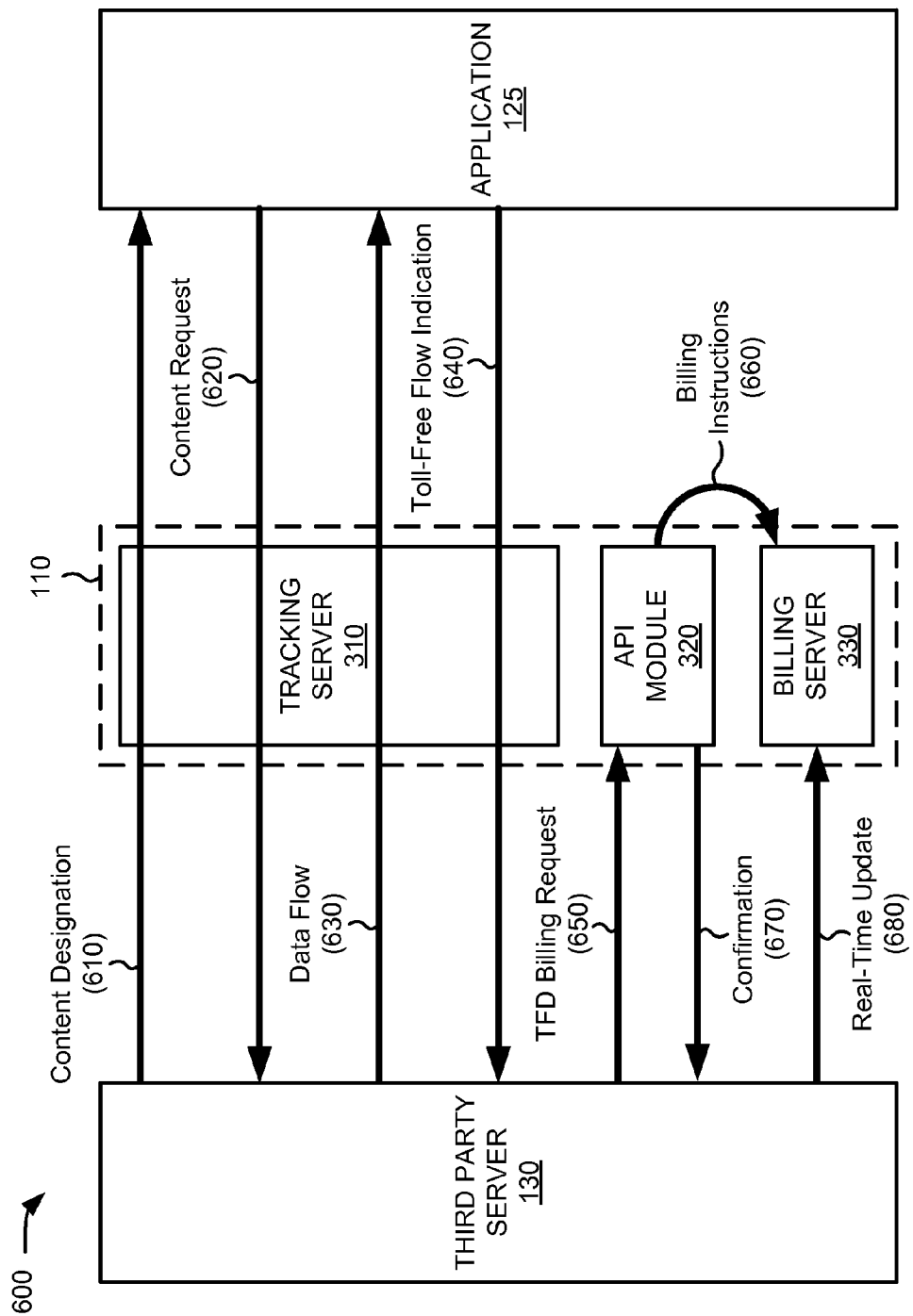
FIG. 6 is a block diagram illustrating exemplary communications between devices in another portion of the network environment of FIG. 1.

FIG. 6 is a block diagram illustrating exemplary communications between devices in a portion 600 of network environment 100. Communications in FIG. 6 may represent communications to designate TFD on demand for a particular data flow. As shown in FIG. 6, network portion 600 may include application 125, third-party vendor system 130, and tracking server 310, API module 320, and billing server 330 of service provider network 110. Application 125, third-party vendor system 130, tracking server 310, API module 320, and billing server 330 may include functionality described above in connection with, for example, FIGS. 1-5.

As shown in FIG. 6, third-party vendor system 130 may provide a toll-free data designation 610 to indicate particular content, available through application 125, that is designated as toll-free. Application 125 may receive TFD designation 610 and present to a user (e.g., of user device 120) that toll-free content is available. A user may provide user input for application 125 to present the toll-free content. In response to the user input, application 125 may generate a content request 620. Content request 620 may include, for example, an API call to identify and obtain the selected content. In response to content request 620, third-party vendor system 130 may provide the content to application 125 via a data flow 630. Data usage amounts for data flow 630 may be logged by tracking server 310.

For each toll-free data call (e.g., HTTP, TCP or UDP), application 125 will record data flow identification information, such as the source IP address, source port, destination IP address, and destination port. Because the content in data flow 630 in FIG. 6 has been designated (e.g., via TFD designation 610) as toll-free, application 125 may generate and send a toll-free indication 640 for data flow 630. Toll-free indication 640 may include, for example, an API call to initiate an on-demand request to charge data flow 630 as toll-free.

Figure 7:
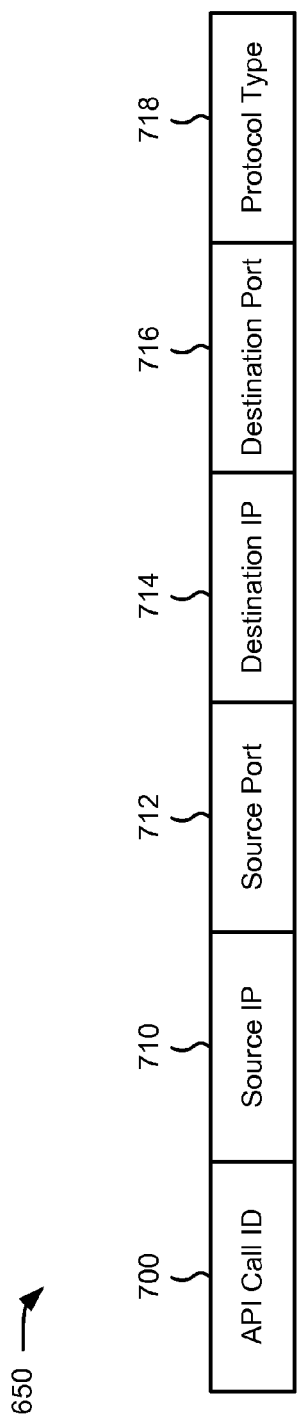
FIG. 7 is an illustration of data fields in the toll-free indication of FIG. 6.

FIG. 7 is an illustration of exemplary data fields in toll-free indication 640. As shown in FIG. 7, toll-free indication 640 may include an API call identification (ID) field 700, a source IP address field 710, a source port field 712, a destination IP address field 714, a destination port field 716, and a protocol type field 718 for a particular data flow 630. API call identification 700 may include, for example, a program identifier and/or API call command to initiate an on-demand request to charge data flow 630 as toll-free. Source IP address field 710, source port field 712, destination IP address field 714, destination port field 716, and protocol type field 718 may provide the five parts of a so-called "five-tuple" that can be used to identify the flow to which a particular packet belongs. For example, each packet of a streaming video content item from a particular content server of third-party vendor system 130 may include the same source IP address (of source IP address field 710), source port (of source port field 712), destination IP address (of destination IP address field 714), destination port (of destination port field 716), and protocol type (of protocol type field 718, such as HTTP, TCP, or UDP). In some implementations, toll-free indication 640 may include more or fewer fields than shown in FIG. 7. For example, protocol type 718 may be excluded in some cases, if third-party vendor system 130 already knows the Layer 4 protocol being used by application 125. As another example, additional descriptive information about the toll-free data content, times, or application 125 may be included in toll-free indication 640.

Returning to FIG. 6, the timing of when toll-free indication 640 is provided by application 125 may vary. Also, a trigger for when application may send toll-free indication 640 may be applied differently for different applications 125. For example, toll-free indication 640 may be sent based on usage thresholds detected by application 125, user participation in other application features (e.g., a survey, trial, etc.), predicated upon a user's entry of a coupon code, etc. In one implementation, application 125 may provide toll-free indication 640 as soon as the required information (e.g., the five-tuple information for the data flow) is known. In another implementation, application 125 may provide toll-free indication 640 at a minimum duration or at the completion of a designated TFD flow.

Third-party vendor system 130 may receive toll-free indication 640 and, in response, may generate an on-demand TFD billing request 650. In one implementation, third-party vendor system 130 may connect to API module 320 via a virtual private network (VPN) or another secure connection to provide TFD billing request 650. On-demand TFD billing request 650 may be in the form of, for example, an API call to API module 320.

Figure 8:
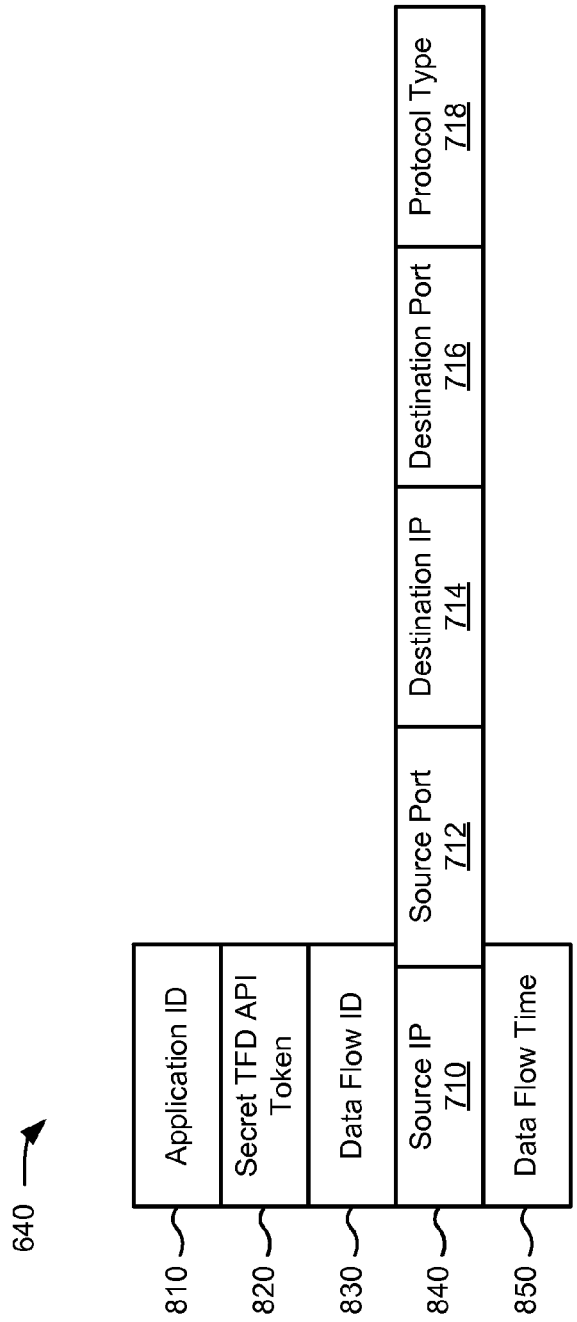
FIG. 8 is an illustration of data field in the open API call of FIG. 6.

FIG. 8 is an illustration of exemplary data fields in on-demand TFD billing request 650. As shown in FIG. 8, TFD billing request 650 may include a third-party application ID field 810, a secret TFD API token field 820, a data flow identifier (ID) field 830, a data flow information field 840, and a data flow time field 850. Third-party application ID field 810 may include application identifier 520 previously assigned during the application registration process (FIG. 5). Similarly, secret TFD API token field 820 may include secret token 530 previously assigned during the application registration process. Data flow identifier field 830 may include a unique identifier for the data flow assigned, for example, by the vendor. Data flow information field 840 may include all or part of the five-tuple information from toll-free indication 640. Data flow time field 850 may include a start time for the particular data flow (e.g., data flow 630), as included by toll-free indication 640 or identified by third-party vendor system 130. In some implementations, TFD billing request 650 may include more or fewer fields than shown in FIG. 8.

Returning to FIG. 6, in response to TFD billing request 650, API module 320 may provide billing instructions 660 to billing server 330. Billing instructions 660 may override a default to charge a user's wireless data plan and instead charge data over the particular data flow to an account associated with application 125 and/or third-party vendor system 130. Billing server 330 may receive billing instructions 660 and provide toll-free billing for the indicated dataflow accordingly.

Also in response to TFD billing request 650, API module 320 may provide confirmation 670 to third-party vendor system 130. Confirmation 670 may include, for example, the data flow ID (e.g., the same data flow ID included in data flow identifier field 830), the data flow size (e.g., the number of bytes of the data flow), and a success/fail indication. The success/fail indication may indicate success if API module 320 finds data packets matching descriptions in TFD billing request 650. The success/fail indication may indicate failure, for example, if API module 320 does not find any data packets matching descriptions in TFD billing request 650.

According to implementations described herein, users at third-party vendor system 130 or other devices may check TFD data usage through a registered login, such as the same authentication information used to register application 125 (e.g., described above in connection with FIG. 5). In one implementation, users of third-party vendor system 130 may access information from billing server 330 (or an intermediate proxy server) to view TFD usage in real time by application ID, by data flow ID and time, by data volume, by operating system, etc.

Figure 9:
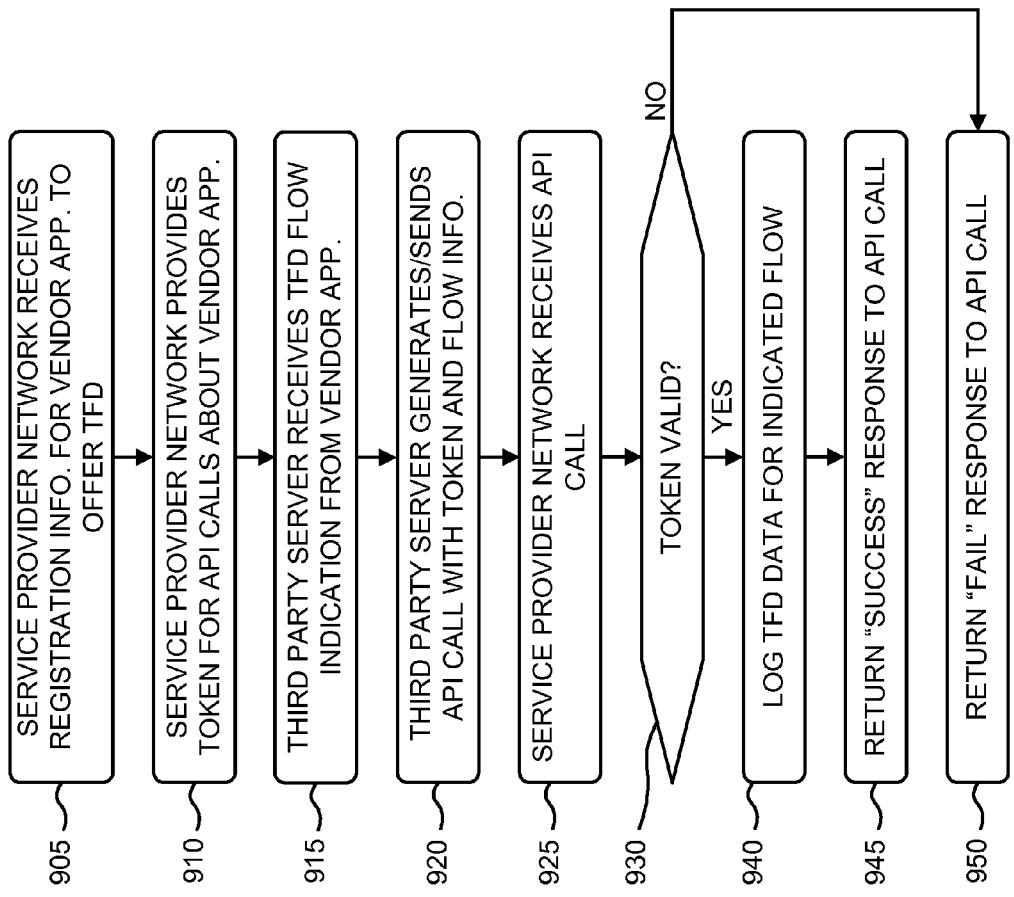
FIG. 9 is a flow diagram of an exemplary process for providing toll-free data on demand, according to an implementation described herein.

FIG. 9 provides a flow diagram of an exemplary process 900 for providing toll-free data on demand. In one implementation, process 900 may be performed by one or more devices in service provider network 110. In another implementation, some or all of process 900 may be performed by another device or group of devices, including or excluding devices in service provider network 110.

As shown in FIG. 9, process 900 may include a service provider network receiving registration information for a vendor application to offer toll-free data (block 905), the service provider network providing a token for API calls relating to the vendor application (block 910), and the third-party server receiving a toll-free data flow indication from the vendor application (block 915). For example, registration server 340 of service provider network 110 may receive registration information for a vendor application that selectively provides access to toll-free data for users. The registration information may include a vendor account to which data charges are to be billed. In response, service provider network 110 may provide a unique token to the third-party vendor that can be used with future on-demand TFD API calls associated with the vendor application. Later, third-party vendor system 130 may receive, from a copy of the vendor application 125 residing on user device 120, flow information, such as toll-free flow indication 640.

Process 900 may also include the third-party server generating and/or sending an API call with the token and flow information (block 920) and service provider network 110 receiving the API call (block 925), and determining if the API call includes a valid token (block 930). For example, third-party vendor system 130 may generate and send an API call to service provider network 110 (e.g., API module 320). The API call, such as TFD billing request 650, may include the token, a vendor's data flow identifier, and flow information. The flow information may identify a particular data flow directed to the copy of the vendor application 125 residing on user device 120. Service provider network 110 may receive the (API) call and validate the token by checking if the token matches a token in a stored list, is current, and/or is associated with the correct vendor.

If the API call includes a valid token (block 930—YES), toll-free data may be logged for the indicated flow (block 940), and a "success" response may be provided to the API call (block 945). For example, if service provider network 110 validates the token, service provider network 110 may identify particular data packets corresponding to the flow information and cause data charges for the particular data packets to be billed to the vendor account. Service provider network 110 may also send, to the third-party vendor system 130, a response to the API call that includes the vendor's data flow identifier and a success indication.

If the API call does not include a valid token (block 930—NO), a "Fail" response may be provided to the API call (block 950). For example, service provider network 110 may deny the request and return a "Fail" response to third-party vendor system 130.

Systems and methods described herein may provide toll-free data on demand that can be implemented for individual data flows in a mobile network. The use of toll-free data on demand enables application developers to be in control of their toll-free data campaigns, allowing vendors to dynamically control which data calls are toll-free and which are not. The systems and methods described herein give freedom for mobile applications and, at the same time, reduces the complexity of backend services of the service provider network.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 8, the order of the blocks may be modified in other implementations. Further, non-dependent blocks may be performed in parallel.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Additionally, embodiments described herein may be implemented as a non-transitory storage medium that stores data and/or information, such as instructions, program code, data structures, program modules, an application, etc. A non-transitory storage medium includes one or more of the storage mediums described in relation to memory/storage 310.

The word "exemplary" is used herein to mean "serving as an example." Any embodiment or implementation described as "exemplary" is not necessarily to be construed as preferred or advantageous over other embodiments or implementations.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
   receiving, by a network device of service provider network, registration information for a vendor application that selectively provides access to toll-free data for users, the registration information including a vendor account to which data charges are billed;
   sending, by a network device and in response to the registration information, a token corresponding to the vendor application;
   receiving, by a network device and from a vendor device, an application programming interface (API) call that includes the token, a data flow identifier, and flow information, the flow information identifying a particular data flow directed to a copy of the vendor application residing on a user device;
   validating, by the network device, the token;
   identifying, by the network device, particular data packets corresponding to the flow information;
   causing, by the network device, data charges for the particular data packets to be billed to the vendor account; and
   sending, by the network device and to the vendor device, a response to the API call that includes the data flow identifier and a success indication.

2. The method of claim 1, further comprising:
   sending, by the vendor device and to the copy of the vendor application on the user device, information that identifies particular content as toll-free.

3. The method of claim 2, further comprising:
   receiving, by the copy of the vendor application, the particular data flow, wherein the particular data flow provides the particular content;
   recording, by the copy of the vendor application, the flow information identifying the particular data flow directed to the copy of the vendor application; and
   sending, by the copy of the vendor application and to the vendor device, the flow information.

4. The method of claim 3, further comprising:
   receiving, by the copy of the vendor application, a user's selection of the particular content; and
   requesting, by the copy of the vendor application, the particular content.

5. The method of claim 4, further comprising:
   presenting, by the copy of the vendor application on the user device, an indication to a user that the particular content includes toll-free data.

6. The method of claim 1, wherein the flow information includes:
   a source Internet Protocol (IP) address,
   a source port,
   a destination IP address, and
   a destination port.

7. The method of claim 6, wherein the flow information further includes:
   a protocol type indicating one of Hyper-text Transfer Protocol (HTTP), Transmission Control Protocol (TCP) or User Datagram Protocol (UDP).

8. The method of claim 1, further comprising:
   sending, by the network device and in response to the registration information, a unique identifier for the vendor application.

9. The method of claim 1, further comprising:
   tracking, by the network device, an amount of data in the particular data packets.

10. The method of claim 1, wherein receiving the API call includes receiving the API call over a virtual private network (VPN) connection.

11. A network device, comprising:
    a network interface to communicate with one or more remote systems;
    one or more memories to store instructions; and
    one or more processors configured to execute instructions in the one or more memories to:
    receive registration information for a vendor application that selectively provides access to toll-free data for users, the registration information including a vendor account to which data charges can be billed;
    send, in response to the registration information, a token corresponding to the vendor application;
    receive, from a vendor device, an application programming interface (API) call that includes the token, a data flow identifier, and flow information, the flow information identifying a particular data flow directed to a copy of the vendor application residing on a user device;
    validate the token;
    identify particular data packets corresponding to the flow information;
    cause data charges for the particular data packets to be billed to the vendor account; and
    send, to the vendor device, a response to the API call that includes the data flow identifier and a success indication.

12. The system of claim 11, wherein the flow information is based on data recorded by the copy of the vendor application.

13. The system of claim 11, wherein the flow information includes:
    a source Internet Protocol (IP) address, a source port, a destination IP address, and a destination port.

14. The system of claim 13, wherein the flow information further includes:

a protocol type indicating one of Hyper-text Transfer Protocol (HTTP), Transmission Control Protocol (TCP) or User Datagram Protocol (UDP).

15. The system of claim 11, wherein the one or more processors are further configured to execute instructions in the one or more memories to:

send, in response to the registration information, a unique identifier for the vendor application.

16. The system of claim 15, wherein the application programming interface (API) call further includes the unique identifier for the vendor application.

17. The system of claim 11, wherein the one or more processors are further configured to execute instructions in the one or more memories to:

track an amount of data in the particular data packets.

18. A non-transitory computer-readable medium including instructions, executed by one or more processors, for causing the one or more processors to:

receive registration information for a vendor application that selectively provides access to toll-free data for users, the registration information including a vendor account to which data charges can be billed;

send, in response to the registration information, a token corresponding to the vendor application;

receive, from a vendor device, an application programming interface (API) call that includes the token, a data flow identifier, and flow information, the flow information identifying a particular data flow directed to a copy of the vendor application residing on a user device;

validate the token;

identify particular data packets corresponding to the flow information;

cause data charges for the particular data packets to be billed to the vendor account; and send, to the vendor device, a response to the API call that includes the data flow identifier and a success indication.

19. The non-transitory computer-readable medium of claim 18, further comprising instructions for causing the one or more processors to:

send, in response to the registration information, a unique identifier for the vendor application.

20. The non-transitory computer-readable medium of claim 18, further comprising instructions for causing the one or more processors to:

track an amount of bytes in the particular data packets.

* * * * *